US010840657B1

(12) United States Patent
Aguilar Ruelas et al.

(10) Patent No.: US 10,840,657 B1
(45) Date of Patent: Nov. 17, 2020

(54) VEHICLE TRIM PANEL POWER OUTLET

(71) Applicant: Ford Global Technologies, LLC, Dearborn, MI (US)

(72) Inventors: Eduardo Arturo Aguilar Ruelas, Mexico City (MX); Silvia Lopez Portela, Mexico City (MX); Alejandra Sofia Herrera Ramirez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/580,196

(22) Filed: Sep. 24, 2019

(51) Int. Cl.
| | |
|---|---|
| *H01R 27/00* | (2006.01) |
| *H01R 13/506* | (2006.01) |
| *H01R 13/447* | (2006.01) |
| *H01R 13/717* | (2006.01) |
| *B60R 16/033* | (2006.01) |
| *H01R 39/64* | (2006.01) |
| *B60R 13/02* | (2006.01) |

(52) U.S. Cl.
CPC ........... *H01R 27/00* (2013.01); *B60R 16/033* (2013.01); *H01R 13/447* (2013.01); *H01R 13/506* (2013.01); *H01R 13/7175* (2013.01); *H01R 39/64* (2013.01); *B60R 13/0256* (2013.01); *H01R 2201/26* (2013.01)

(58) Field of Classification Search
CPC ........ H01R 39/64; H01R 35/04; H01R 27/00; H01R 13/506; H01R 13/447; H01R 13/7175; H01R 2201/26; B60R 16/033; B60R 13/0256

USPC ................................................ 439/13–30, 34
See application file for complete search history.

(56) References Cited

U.S. PATENT DOCUMENTS

| | | | | |
|---|---|---|---|---|
| 3,652,972 | A * | 3/1972 | Kreider .................. | H01R 39/64 439/21 |
| 4,943,241 | A * | 7/1990 | Watanabe ........... | B60R 16/0207 174/72 A |
| 6,821,134 | B2 | 11/2004 | Chen | |
| 8,123,528 | B2 | 2/2012 | Devlin et al. | |
| 8,500,484 | B2 | 8/2013 | Hu | |
| 8,905,764 | B2 | 12/2014 | Cheng | |
| 9,106,037 | B2 | 8/2015 | Lee et al. | |
| 9,438,051 | B2 | 9/2016 | Firman, II et al. | |
| 10,297,967 | B2 * | 5/2019 | Wei ........................ | H01R 31/06 |
| 10,418,768 | B1 * | 9/2019 | Xiao ...................... | H01R 35/04 |

(Continued)

FOREIGN PATENT DOCUMENTS

| | | |
|---|---|---|
| CN | 204349166 U | 5/2015 |
| FR | 2808133 A1 | 10/2001 |

(Continued)

*Primary Examiner* — Gary F Paumen
(74) *Attorney, Agent, or Firm* — David Coppiellie; Price Heneveld LLP

(57) ABSTRACT

A power outlet for a vehicle trim panel comprises an electrical socket having first and second bezels. The second bezel includes a pin that extends toward the first bezel and an adapter assembly is disposed within the electrical socket between the first and second bezels such that a first conductive plate of the adapter assembly is aligned and in contact with a second conductive plate on the pin. The adapter assembly has a base with a plurality of terminals disposed within the base and a faceplate, wherein the adapter assembly is rotatable about a center axis of the electrical socket.

19 Claims, 4 Drawing Sheets

(56) References Cited

U.S. PATENT DOCUMENTS

| | | | |
|---|---|---|---|
| 2006/0110948 A1* | 5/2006 | Gerard | H01R 24/22 439/21 |
| 2006/0281349 A1* | 12/2006 | Chong | H01R 35/04 439/131 |
| 2009/0280665 A1 | 11/2009 | Yang | |
| 2015/0311658 A1* | 10/2015 | Zamarron | H01R 39/64 439/13 |
| 2018/0062334 A1 | 3/2018 | Liao | |
| 2019/0044295 A1* | 2/2019 | Wei | H01R 24/22 |

FOREIGN PATENT DOCUMENTS

| | | |
|---|---|---|
| KR | 20170061956 A | 6/2017 |
| KR | 20170064237 A | 6/2017 |
| KR | 101783855 B1 | 10/2017 |

* cited by examiner

VEHICLE TRIM PANEL POWER OUTLET

FIELD OF THE INVENTION

The present disclosure generally relates to vehicle trim panels having an integrated power outlet.

BACKGROUND OF THE INVENTION

Vehicles typically include trim panels disposed within the interior of the vehicle. The trim panels may be disposed in areas of the interior of the vehicle where occupants require storage, or power to portable, handheld devices. For example, occupants may wish to power, or charge tablets, smart phones, computers or any other electronic device requiring power. The trim panel may include at least one power outlet. The power outlet may be configured to accept an occupant electronic device within an electrical socket, and provide power to the occupant electronic device through the electrical socket. However, the power outlet may be configured to accept only a single type of adapter for the occupant electronic devices within the electrical socket. Additionally, the power outlet may be arranged on the trim panel such that the power adapter for the occupant electronic devices interferes with adjacent electrical sockets within the power outlet.

SUMMARY OF THE INVENTION

According to a first aspect of the present disclosure, a power outlet for a vehicle trim panel comprises an electrical socket having first and second bezels. The second bezel includes a pin that extends toward the first bezel and an adapter assembly is disposed within the electrical socket between the first and second bezels such that a first conductive plate of the adapter assembly is aligned and in contact with a second conductive plate on the pin. The adapter assembly has a base with a plurality of terminals disposed within the base and a faceplate, wherein the adapter assembly is rotatable about a central axis of the electrical socket.

Embodiments of the first aspect of the invention can include any one or a combination of the following features:
  the electrical socket having first and second bezels, the second bezel includes a pin that extends toward the first bezel;
  an adapter assembly disposed within the electrical socket between the first and second bezels such that a first conductive plate of the adapter assembly is aligned and in contact with a second conductive plate on the pin, the adapter assembly has a base with a plurality of terminals disposed within the base and a faceplate, wherein the adapter assembly is rotatable about a center axis of the electrical socket;
  a light disposed on the faceplate such that the adapter assembly is illuminable;
  a spring attached with, and disposed between, a back of the base and a first conductive plate, the spring presses the first conductive plate against a second conductive plate disposed within the second bezel to transmit energy through the electrical socket;
  the faceplate includes a sheath defining slots, the sheath extends around an outer surface of the base having bars that engage the slots;
  a cover attached to, and hinged with, a side of the first bezel;
  the adapter assembly rotates 360 degrees about the center axis of the power outlet; and
  the faceplate is formed form a material that allows light transmission through the faceplate such that the adapter assembly is illuminable.

According to a second aspect of the present disclosure, a vehicle comprises a trim panel disposed within an interior of the vehicle, and an electrical socket including an adapter assembly disposed within the trim panel. The adapter assembly is disposed between first and second bezels of the electrical socket and includes a base with a plurality of terminals disposed within the base and a faceplate, wherein the adapter assembly is rotatable about a central axis of the electrical socket.

Embodiments of the second aspect of the invention can include any one or a combination of the following features:
  the trim panel disposed within an interior of the vehicle;
  an electrical socket includes an adapter assembly disposed within the trim panel, the adapter assembly being disposed between first and second bezels of the electrical socket and includes a base with a plurality of terminals disposed within the base and a faceplate, wherein the adapter assembly is rotatable about a center axis of the electrical socket;
  a spring attached with, and disposed between, a back of the base and a first conductive plate, the spring presses the first conductive plate against a second conductive plate disposed within the second bezel to transmit energy through the electrical socket;
  the second bezel includes a pin that extends through the first and second conductive plates;
  the adapter assembly rotates 360 degrees about the central axis on the pin such that the first and second conductive plates maintain contact;
  the second bezel includes a plurality of clips that secure the electrical socket into the trim panel;
  the faceplate includes a sheath defining slots, the sheath extends around an outer surface of the base having bars that engage the slots; and
  the first bezel engages the second bezel using a plurality of clips.

According to a third aspect of the present disclosure, a trim panel for a vehicle, comprises an electrical socket having an adapter assembly disposed between first and second bezels, the adapter assembly having a base with a plurality of terminals disposed within the base and a faceplate, wherein the adapter assembly is rotatable about a center axis of the electrical socket, and a spring attached with, and disposed between, a back of the base and a first conductive plate, the spring presses the first conductive plate against a second conductive plate disposed within the second bezel to transmit energy through the electrical socket.

Embodiments of the third aspect of the invention can include any one or a combination of the following features:
  the electrical socket having an adapter assembly disposed between first and second bezels, the adapter assembly having a base with a plurality of terminals disposed within the base and a faceplate, wherein the adapter assembly is rotatable about a central axis of the electrical socket;
  a spring attached with, and disposed between, a back of the base and a first conductive plate, the spring presses the first conductive plate against a second conductive plate disposed within the second bezel to transmit energy through the electrical socket;
  the faceplate includes a sheath defining slots, the sheath extends around an outer surface of the base having bars that engage the slots;

the adapter assembly rotates 360 degrees about the center axis;

the second bezel includes a pin that extends through the first and second conductive plates to maintain contact between the first and second conductive plates;

the faceplate is formed form a material that allows light transmission through the faceplate such that the electrical socket is illuminable; and the first conductive plate defines a surface area being less than a surface area of the first conductive plate.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
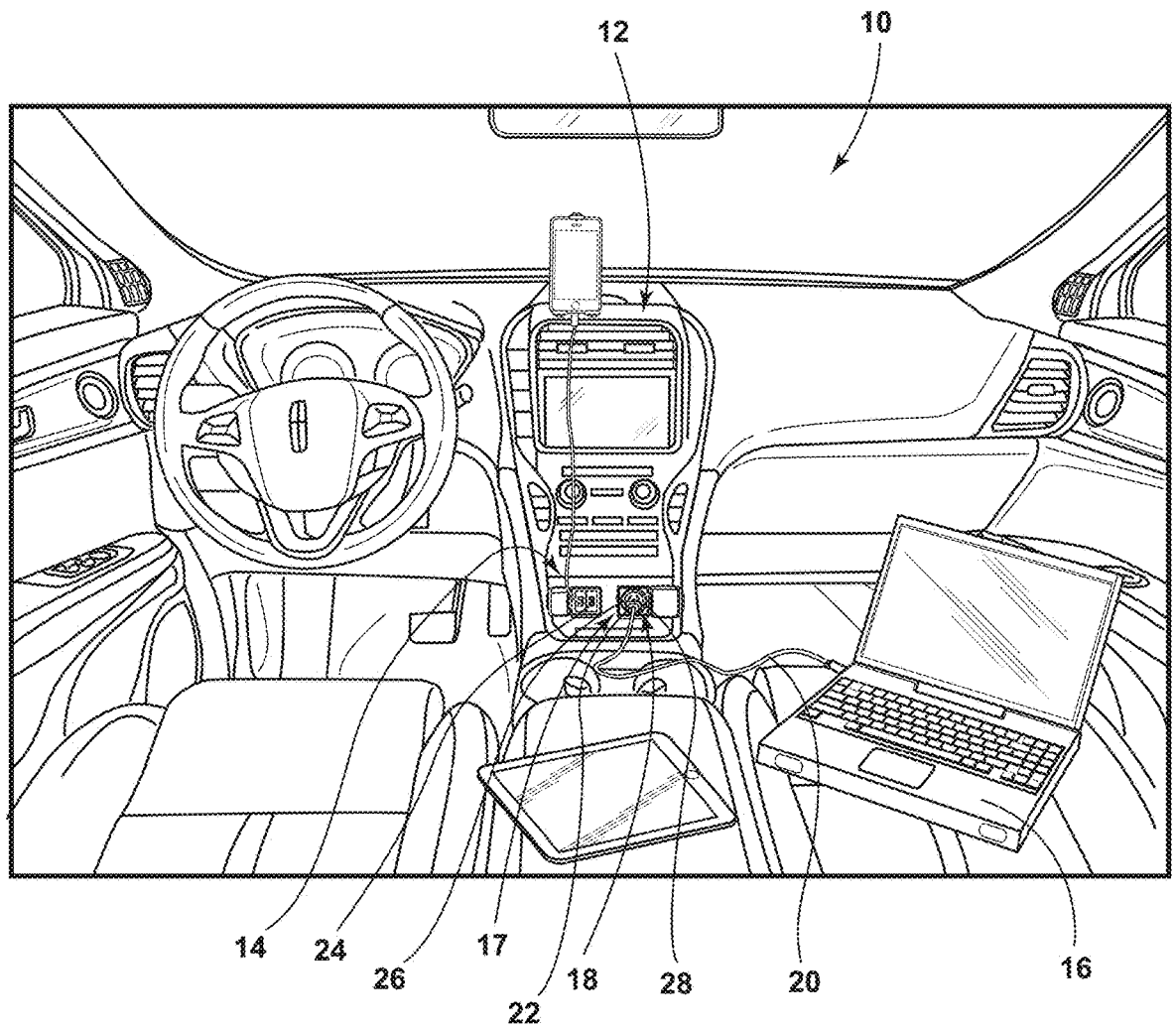
FIG. 1 is a front perspective view of an interior of a vehicle having a trim panel with at least one power outlet, according to one embodiment.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Referring to FIG. 1, a vehicle 10 is depicted with an interior area 12 with a trim panel 14 to charge a plurality of electronic devices 16. The plurality of electronic devices 16 may be configured to be coupled with a power outlet 17 disposed within the trim panel 14. The trim panel 14 may be any panel disposed within the interior area 12 of the vehicle 10, including, but not limited to, an instrument panel, a dash panel, a console unit, a floor, door panels, or any other surface capable of being coupled with the power outlet 17. Additionally, or alternatively, the power outlet 17 may be disposed in a trunk or frunk areas (not shown) in the vehicle. The frunk area may be a storage compartment disposed under a hood (not shown) in a front of the vehicle 10. The power outlet 17 includes an electrical socket 18. The electrical socket 18 receives a power cord 20 for each of the electronic devices 16 using a power adapter 22 to interface with the power outlet 17. The power adapter 22 interconnects the power outlet 17 with the plurality of electronic devices 16 to transfer power from a vehicle battery (not shown) in order to charge each of the electronic devices 16.

As depicted in FIG. 1, each of the plurality of electronic devices 16 may use a different power adapter 22 to interface with the power outlet 17. Different power adapters 22 between each of the plurality electronic devices 16 require that the power outlet 17 be configured to accept the different power adapters 22. For example, an electronic device 16 having a power adapter 22 designed for a European power cord 20 may be different from an electronic device 16 having a power adapter 22 designed for an American power cord 20. The power outlet 17 may be configured to interface with each of the different power adapters 22. Additionally, having different power adapters 22 between each of the plurality of electronic devices 16 may cause interference once the power adapters 22 are coupled with the power outlet 17. For example, the power adapter 22 may be designed such that coupling the power adapter 22 with the power outlet 17 causes the power cord 20 to extend across and prevent access to an input 24 for an additional electronic device 16. This interference reduces a number of electronic devices 16 that may be coupled with, and interfaced to, the electrical socket 18 in the trim panel 14.

In at least one embodiment, the trim panel 14 may include an electrical socket 18 that couples with the plurality of electronic devices 16 using any different type of power adapter 22 for each of the different electronic devices 16. For example, the electrical socket 18 may include a faceplate 26 that couples the power adapters 22 for each of the electronic devices 16 to the power outlet 17, in which the faceplate 26, as will be described in more detail below, is configured to receive a variety of power adapter styles. Receiving a variety of power adapter styles allows the power outlet 17 to provide power to each of the plurality of electronic devices 16 regardless of the power adapter 22 being used to couple the power electrical socket 18 with the plurality of electronic devices 16. This allows occupants to charge and power a variety of different electronic devices 16. Additionally, the adaptability of the faceplate 26 of the power outlet 17 may be advantageous to occupants using electronic devices 16 from a different region, or country, such that special equipment to couple the electrical socket 18 with the power adapter 22 for the electronic devices 16 is not required.

As described above, with different power adapters 22 for each of the plurality of electronic devices 16, interference between inputs 24 for the electrical socket 18 on the trim panel 14 may prevent use of each input 24 on the trim panel 14. For example, the power cord 20 for an electronic device 16 having a power adapter 22 using two prongs may occlude an input 24 on the trim panel 14 used for a power adapter 22 using a Universal Serial Bus ("USB"). To prevent interference, the faceplate 26 of the electrical socket 18 may rotate about a central axis 28 of the electrical socket 18. The faceplate 26 may rotate 360° around the central axis 28 to accommodate the power adapters 22 and power cords 20 such that each input 24 for the electrical socket 18 on the trim panel 14 may receive a power adapter 22 and couple an electronic device 16 to the electrical socket 18 to power the electronic device 16. Rotation of the faceplate 26 further provides adaptability to the electrical socket 18 and the trim panel 14 to charge and power each of the electronic devices 16.

Figure 2:
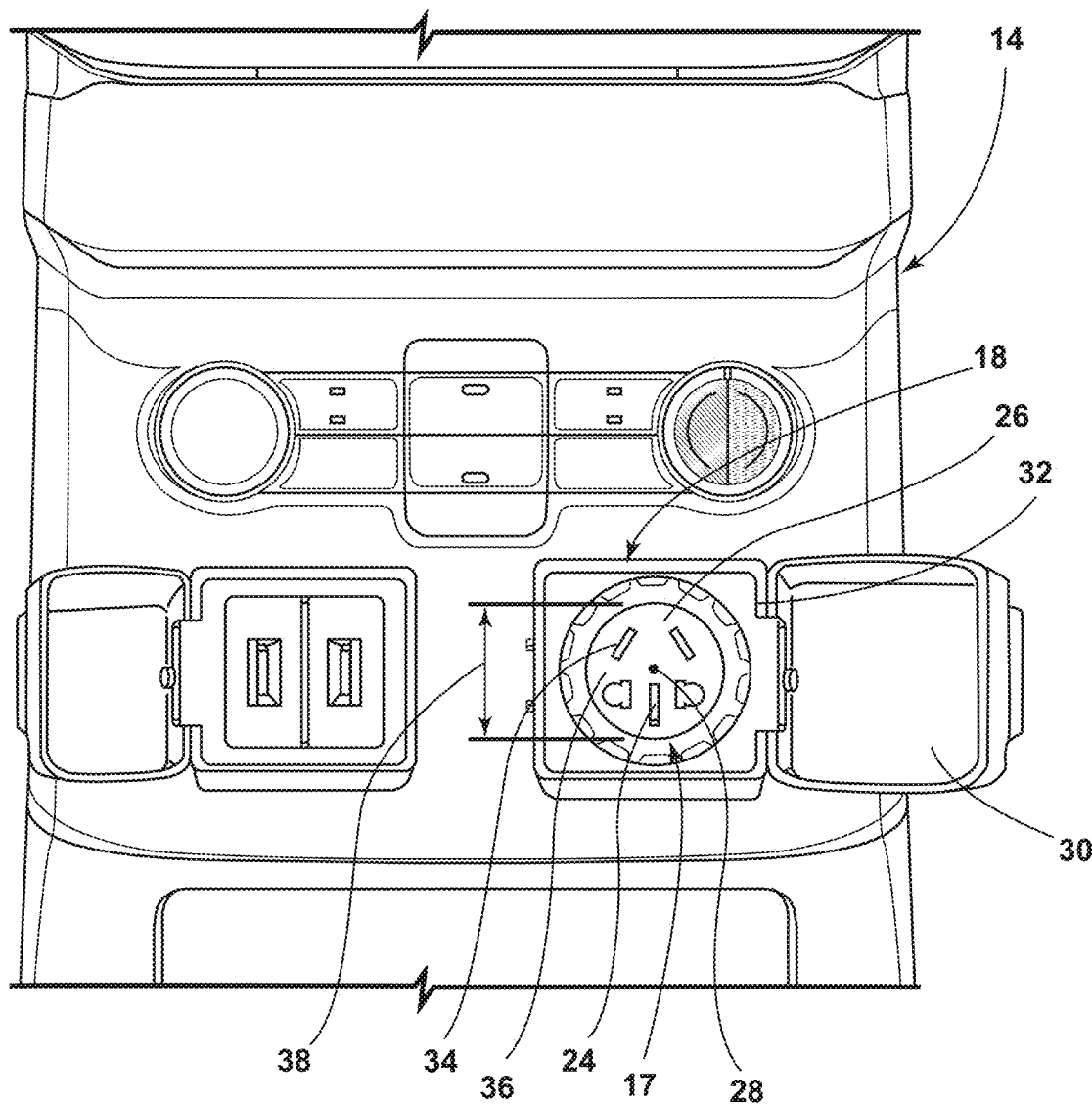
FIG. 2 is a front, schematic view of a trim panel including the power outlet, which has a rotatable faceplate.

FIG. 2 depicts a front, schematic view of the trim panel 14 depicting the rotatable faceplate 26. Again, the faceplate 26 may be configured to rotate around the central axis 28 to avoid interference between the inputs 24 and power cords of the electronic devices. As shown in FIG. 2 the electrical socket 18 may further include a cover 30. The cover 30 is depicted in FIG. 2 as hinged to a side 32 of the electrical socket 18. This is merely exemplary. The cover 30 may be arranged on the electrical socket 18 on any of the sides 32 of the electrical socket 18. In the embodiment shown in FIG. 2, the cover 30 is disposed on the side 32 to avoid pressure on the power adapter 22 that couples with the faceplate 26. The cover 30 may be configured to cover 30 the faceplate 26 and the electrical socket 18 during non-use of the power outlet 17. Therefore, the cover 30 may be used to protect the faceplate 26 when the electrical socket 18 is not coupled with the power adapter 22 of the electronic device 16.

The faceplate 26 may define a plurality of terminals 34. As will be described in more detail below, the plurality of terminals 34 provide electrical coupling between the power adapter 22 and the electrical socket 18 to transfer power to the electronic devices 16. As shown in one example, the faceplate 26 may define at least seven terminals 34. A number of terminals 34 may vary between faceplates 26 based on use of the electrical socket 18 and design of the power adapters 22 for each of the electronic devices. The number of terminals 34 may additionally be based on an area 36 of the faceplate 26. For example, electrical socket 18 having a faceplate 26 with less area 36 may include fewer terminals 34 than an electrical socket 18 having a faceplate 26 with greater area 36. The area 36 of the faceplate 26 may be based on a diameter 38 of the faceplate 26. Therefore, an electrical socket 18 having a faceplate 26 with a diameter 38 being greater than a corresponding electrical socket 18 may include a greater number of terminals 34. Stated differently, the area 36 of the faceplate 26 may be defined by the diameter 38 of the faceplate 26, which constrains the number of terminals 34 supported by the electrical socket 18.

In a similar manner, the area 36 of the faceplate 26 may also be dependent on a size of the vehicle 10. For example, a smaller vehicle 10, such as, but not limited to, a sedan, a compact, or a sport vehicle, may have a faceplate 26 with a smaller diameter 38, and therefore lesser area 36 than a larger vehicle 10, such as, but not limited to, a truck, a Sport Utility Vehicle ("SUV"), or a van. Additionally, the diameter 38 of the faceplate 26 may depend on use of the vehicle 10. For example, a vehicle 10 used for commercial applications, such as, but not limited to, work trucks, semi-trailers, or specialized vans, may include a faceplate 26 having a diameter 38, and therefore an area 36, greater than a vehicle 10 used for personal applications. Again, the number of terminals 34 may be variable depending on a type and use of the vehicle 10, which may define the area 36 on the faceplate 26 for the terminals 34. This provides further adaptability for the electrical socket 18 to be used across vehicle applications.

The faceplate 26 may also be illuminable. The faceplate 26 may be formed to include a photoluminescent material such that the faceplate 26 emits light into the interior area 12 of the vehicle 10. The faceplate 26 may absorb photons to emit light into the interior area 12 of the vehicle 10. While described as a photoluminescent material, the faceplate 26 may be formed from any material that allows light transmission through the faceplate 26 such that the faceplate 26 is illuminable and visible to occupants in the interior area 12 of the vehicle 10 during embodiments of low light, or if the interior area 12 is dark. For example, if the interior area 12 defines a lumen less than a lumen threshold indicative of interior area 12 being dark, the faceplate 26 emits light into the interior area 12 from the absorbed photons such that the faceplate 26 is visible to occupants. Emitting light into the interior area 12 allows for the faceplate 26 to be easily identified by the occupants. Likewise, if the interior area 12 defines a lumen greater than a lumen threshold indicative of the interior area 12 being bright, the faceplate 26 may absorb photons from a light source, as described.

Figure 3:
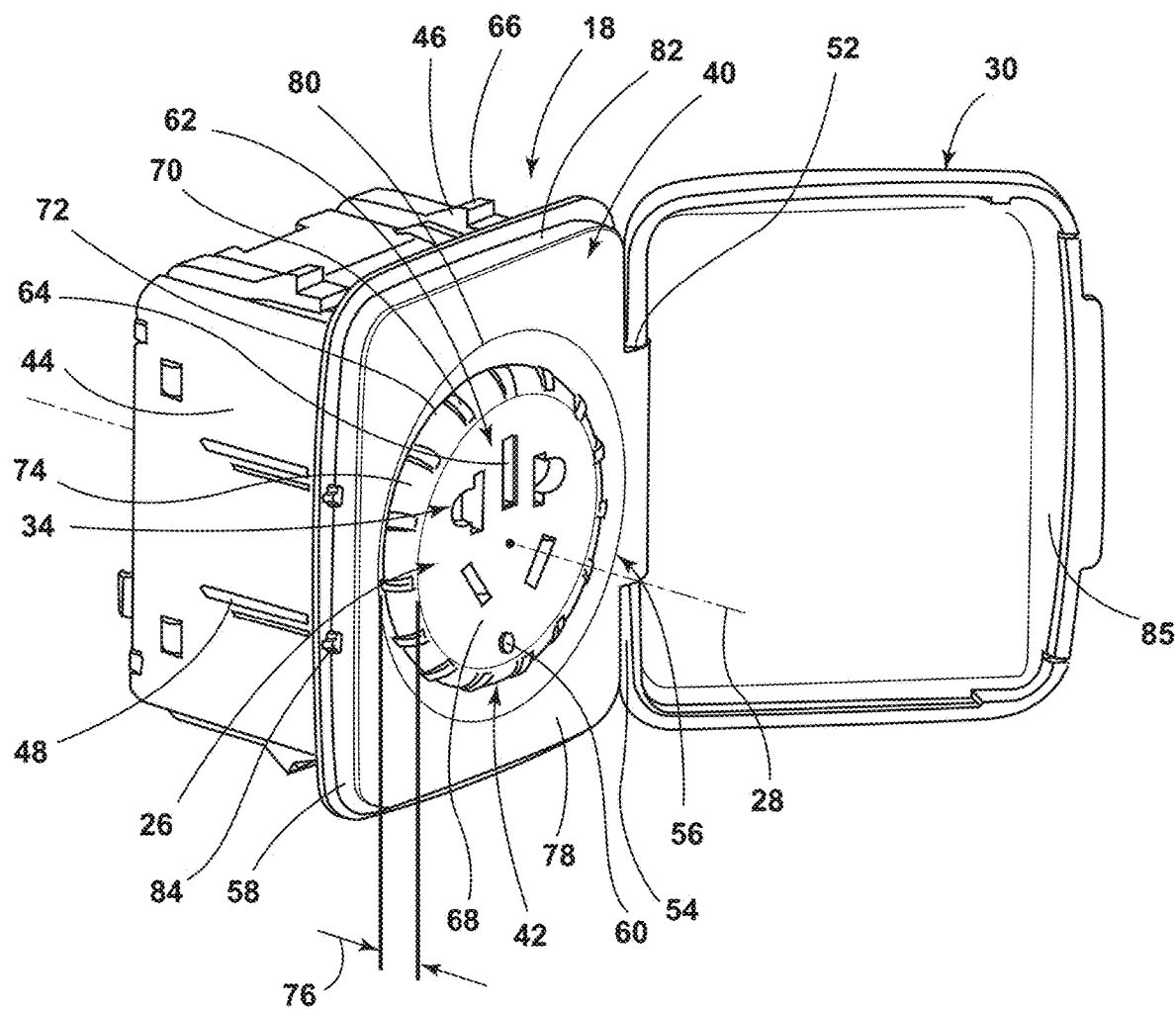
FIG. 3 is a perspective view of the power outlet with the rotatable faceplate including a light.

Referring to FIG. 3, a perspective view of the electrical socket 18 is depicted. As shown in FIG. 3, the faceplate 26 extends through a first bezel 40. As will be discussed in more detail below, the faceplate 26 is formed on an adapter assembly 42. The adapter assembly 42 is configured to transfer energy from the vehicle battery (not shown) through the faceplate 26 to the plurality of electronic devices 16. As depicted in FIG. 3, the adapter assembly 42 is disposed between the first bezel 40 and a second bezel 44. The second bezel 44 includes a plurality of clips 46 that secure the electrical socket 18 in the trim panel 14. In a similar manner, the first bezel 40 may include at least two ridges 48 that aid to secure the first bezel 40 to the second bezel 44. FIG. 3 also depicts the cover 30 being hinged to the first bezel 40. The cover 30 may define a living hinge 52 between the first bezel 40 and a side 54 of the cover 30. The living hinge 52 allows the cover 30 to rotate from a first bezel side 56 to a second bezel side 58 of the first bezel 40. Rotation of the cover 30 provides protection to the faceplate 26 when the electrical socket 18 is not in use.

FIG. 3 depicts another embodiment of the faceplate 26. In the embodiment shown in FIG. 3, the faceplate 26 further includes a light 60 disposed on the faceplate 26. The light 60 further allows for the faceplate 26 to be identified when the interior area 12 of the vehicle 10 is dark, as described above, or less than the lumen threshold. In the embodiment depicted in FIG. 3, the light 60 may be a Light Emitting Diode ("LED"). In at least one other embodiment, the light 60 may be an incandescent bulb, a light pipe, a micro-LED, or any other light-emitting device capable of illuminating the faceplate 26 if the interior area 12 defines a lumen less than the lumen threshold. Again, the light 60 may allow for easy identification of the faceplate 26 and electrical socket 18 to allow an occupant to readily power electronic devices 16. Illumination of the faceplate 26 allows the occupants to more easily identify the plurality of terminals 34 defined on the faceplate 26, and insert the power adapter 22 for the electronic device 16 into the plurality of terminals 34.

As described above, the faceplate 26 may define at least seven terminals 34 in some embodiments. The at least seven terminals 34 may define a pattern 62. The pattern 62 may be arranged on the faceplate 26 to accept a variety of power adapters 22 used for differing electronic devices 16. The pattern 62 may also be based on the area 36 of the face plate 26, previously described. The plurality of terminals 34 may be arranged on the faceplate 26 such that the faceplate 26 is configured to receive rectangular as well as circular prongs (not shown) used to transfer energy from the vehicle battery (not shown) through the adapter assembly 42 to the power adapter 22 of the electronic device 16. The pattern 62 is also defined based on region. For example, the pattern 62 may be defined for the North American, European, and Asian markets. The terminals 34 may be arranged based on the pattern 62. As by way of example, the Asian market pattern 62 is described in more detail.

Specifically, the pattern 62 of the terminals 34 may be arranged such that five individual terminals 64 are disposed across a first faceplate portion 66, and at least two individual terminals 64 are disposed across a second faceplate portion 68. The first and second faceplate portions 66, 68 may be an area 36 above and below the central axis 28, respectively. The individual terminals 64 disposed across the first faceplate portion 66 may be arranged such that two, circular terminals 64 are arranged closer to the first and second bezel sides 56, 58 of the first bezel 40, respectively. Three rectangular terminals 64 are arranged inside the circular terminals 64 such that the rectangular terminals 64 define less distance to the central axis 28 than the circular terminals 64. Additionally, the three rectangular terminals 64 may be arranged such that the rectangular terminals 64 are disposed symmetric across the central axis 28 and are substantially equal in size and area, and one of the rectangular terminals 64 may be aligned with the central axis 28, and define a greater size and area than the other rectangular terminals 64. The two individual terminals 64 disposed across the second faceplate portion 68 may be disposed at symmetric angles relative to the central axis 28, define a rectangular shape, and have a substantially equal area. The pattern 62 allows the faceplate 26 to receive a variety of power adapters 22 for differing electronic devices 16, and provides adaptability for the electrical socket 18.

The faceplate 26 may further define a plurality of protrusions 70 defined around a periphery 72 of the faceplate 26. The plurality of protrusions 70 may be defined on an edge 74 of the faceplate 26. The plurality of protrusions 70 may provide texture to the edge 74 of the faceplate 26 to allow occupants to rotate the faceplate 26 about the central axis 28, as previously described. The plurality of protrusions 70 may increase a frictional force across a hand of the occupant to aid in gripping the edge 74 to rotate the adapter assembly 42 between the first and second bezels 40, 44 within the electrical socket 18. The edge 74 may also define a thickness 76. The thickness 76 of the edge 74 may be equal to a distance from the faceplate 26 to a first surface 78 of the first bezel 40. The thickness 76 of the edge 74 may be designed based on an optimization between gripping force and packaging space. For example, the thickness 76 of the edge 74 may be set based on an appropriate thickness 76 for occupants to grip the plurality of protrusions 70 and rotate the adapter assembly 42. Likewise, the thickness 76 of the edge 74 may be based on allowable dimensions for the first bezel 40 such that the faceplate 26 is flush with the first surface 78 of the first bezel 40. As will be described in more detail with reference to FIG. 4, the first bezel 40 defines a cutout 80 that receives the adapter assembly 42 such that the faceplate 26 is in-plane, or flush with the first surface 78 of the first bezel 40.

Additionally, the first bezel 40 may define a second surface 82 being formed substantially perpendicular to the first surface 78. The second surface 82 may be formed with at least one projection 84 extending perpendicular to the second surface 82. The projection 84 is configured to secure the cover 30 across the first surface 78 when the cover 30 is in a closed position when rotated. Specifically, the projection 84 contacts an inner surface 85 of the cover 30 to secure the cover 30 across the first surface 78. FIG. 3 depicts the second surface 82 being formed with two projections 84. This embodiment is merely exemplary. The second surface 82 may define a number of projections 84 to sufficiently prevent the cover 30 from unwanted exposure of the faceplate 26 when the electrical socket 18 is not in use.

Figure 4:
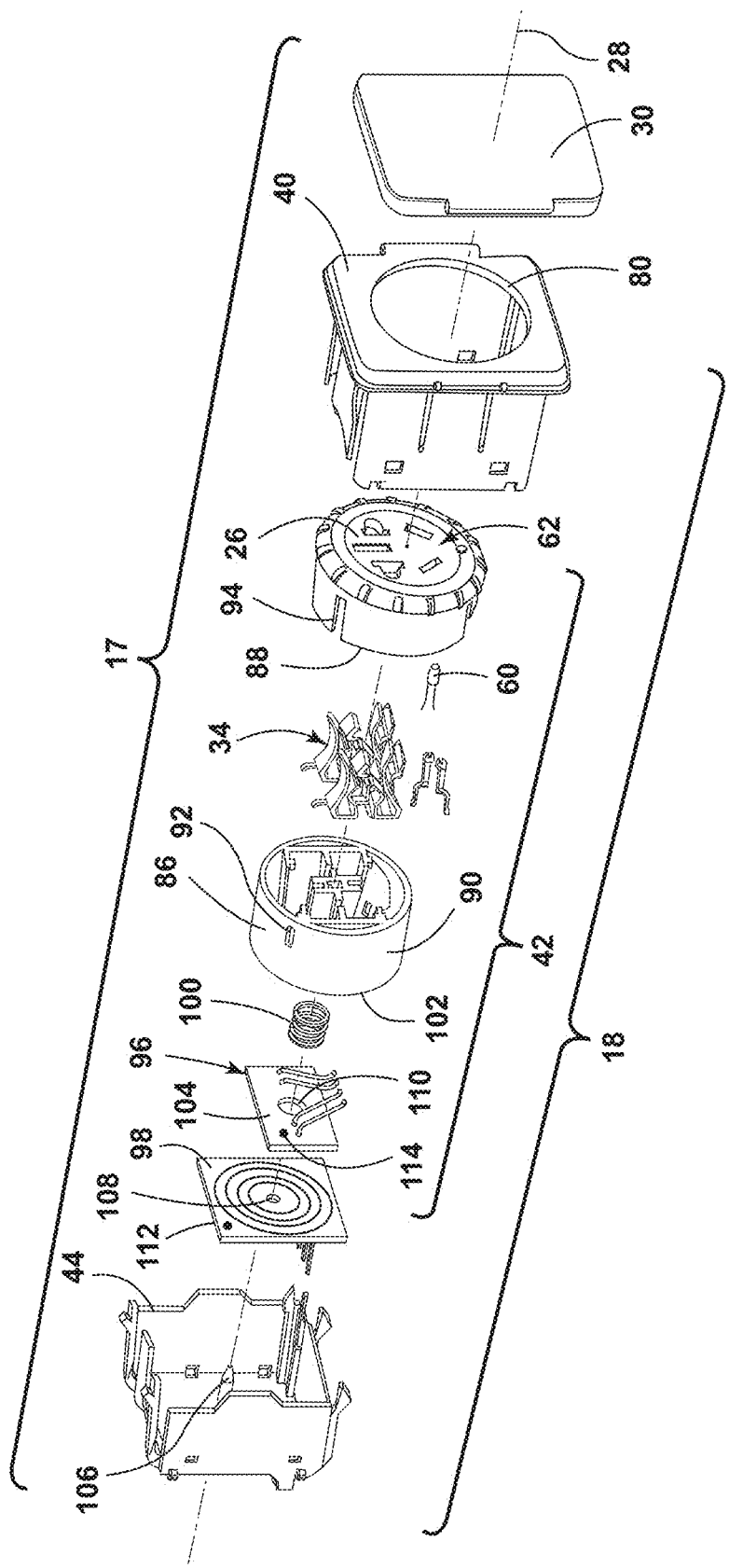
FIG. 4 is an exploded, perspective view of the power outlet.

FIG. 4 depicts an exploded, perspective view of the power outlet 17 including the electrical socket 18 and the adapter assembly 42. Depicted in FIG. 4, the first and second bezels 40, 44 that comprise the electrical socket 18 encapsulate a base 86 of the adapter assembly 42, and the faceplate 26 of the adapter assembly 42 extends through the cutout 80 of the first bezel 40. The faceplate 26 further includes a sheath 88 that extends over the base 86 within the cutout 80 of the first bezel 40. Specifically, the sheath 88 extends over an outer surface 90 of the base 86. As shown in FIG. 4, the sheath 88 may define at least one slot 94 that interacts with at least one bar 92 formed on the outer surface 90 of the base 86. The at least one slot 94 slides around the bar 92 on the outer surface 90 of the base 86 to transmit rotational force applied to the faceplate 26 through the adapter assembly 42. For example, if an occupant rotates the faceplate 26, the at least one bar 92 engages the at least one slot 94 such that the adapter assembly 42 rotates in unison.

The plurality of terminals 34 are shown exploded from the faceplate 26, and the plurality of terminals 34 may be arranged such that the pattern 62 provides conductive contact between the power adapter 22 of the electronic device 16 and the plurality of terminals 34. Therefore, the plurality of terminals 34, in at least one embodiment, may be formed from a metallic material to conduct electricity from the vehicle battery (not shown) through the power outlet 17 to the electronic devices 16. The plurality of terminals 34 may be formed from any material that conducts electricity to provide power to the electronic device 16. The plurality of terminals 34 are stored in the base 86. The adapter assembly 42 transmits energy through the electrical socket 18 by wiring a first conductive plate 96 to the plurality of terminals 34 through the base 86. The first conductive plate 96 may be formed from any electrically conductive material. However, in at least one embodiment, the first conductive plate 96 may be formed from a metallic material to transfer electrical energy to the plurality of terminals 34.

The first conductive plate 96 transfers energy through contacting a second conductive plate 98 attached to a power source, such as, but not limited to, a vehicle battery (not shown). The second conductive plate 98 may be disposed within the second bezel 44. The first conductive plate 96 may be attached to the base 86 via a spring 100 that interconnects the base 86 and the first conductive plate 96 while asserting a biasing force on the first conductive plate 96 to maintain contact with the second conductive plate 98. Additionally, the spring 100 is secured to a back 102 of the base 86. The spring 100 may be adhered to the back 102 of the base 86, or the back 102 of the base 86 may be formed with a groove (not shown) designed to support the spring 100. Similarly, the spring 100 may be secured to a front 104 of the first conductive plate 96. Again, the spring 100 may be adhered to the front 104 of the first conductive plate 96, or joined using any other known joining method. Therefore, when the faceplate 26 is rotated, the entire adapter assembly 42, including the sheath 88, the plurality of terminals 34 disposed in the base 86, the spring 100, and the first conductive plate 96, is rotated with the faceplate 26.

The first conductive plate 96 and the second conductive plate 98 are lined along the central axis 28 of the power outlet 17. The second bezel 44 may further define a pin 106 that extends toward the first bezel 40 within the electrical socket 18 along the central axis 28. The second conductive plate 98 may define an alignment hole 108 that receives the pin 106. The alignment hole 108 may be defined on the second conductive plate 98 to ensure that the second conductive plate 98 is supported in the second bezel 44, as well as aligned with the first conductive plate 96. The alignment hole 108 may be defined on the second conductive plate 98 based on an optimal alignment with the first conductive plate 96. The alignment hole 108 may define a diameter (not shown) substantially equal to a diameter (not shown) of the pin 106 such that the second conductive plate 98 maintains a constant position in the second bezel 44.

Similarly, the first conductive plate 96 defines a rotatable hole 110. The rotatable hole 110 defines a diameter (not shown) greater than a diameter (not shown) of the pin 106 such that when the faceplate 26 is rotated, the adapter assembly 42, including the first conductive plate 96, is also rotated on the pin 106. Therefore, the rotatable hole 110 defines a clearance (not shown) between the first conductive plate 96 and the pin 106 to allow the adapter assembly 42 to rotate when the faceplate 26 is rotated by the occupant. Additionally, the second conductive plate 98 may define a surface area 112 being greater than a surface area 114 of the first conductive plate 96. The surface area 112 of the second conductive plate 98 being greater than the surface area 114 of the first conductive plate 96 ensures that energy is transferred through contact between the first and second conductive plates 96, 98 during rotation of the adapter assembly 42. Again, the spring 100 presses the first conductive plate 96 against the second conductive plate 98 during rotation of the adapter assembly 42. The spring 100 ensures that the first and second conductive plates 96, 98 maintain contact during rotation to transfer energy through the power outlet 17 to the electronic devices 16. This allows adapter assembly 42 to be rotatable between the first and second bezels 40, 44 of the electrical socket 18. Again, the adapter assembly 42 being rotatable allows the faceplate 26 to be arranged such that interference with an adjacent electrical socket (not shown) is avoided.

It is to be understood that variations and modifications can be made on the aforementioned structure without departing from the concepts of the present invention, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A power outlet for a trim panel for a vehicle, comprising:
   an electrical socket having first and second bezels, the second bezel including a pin that extends toward the first bezel; and
   an adapter assembly disposed within the electrical socket between the first and second bezels such that a first conductive plate of the adapter assembly is aligned and in contact with a second conductive plate on the pin, the adapter assembly having a faceplate and a base with a plurality of terminals disposed within the base, wherein the adapter assembly is rotatable about a central axis of the electrical socket.

2. The power outlet of claim 1 further comprising a light source disposed on the faceplate such that the adapter assembly is illuminable.

3. The power outlet of claim 1 further comprising a spring attached with, and disposed between, a back of the base and a first conductive plate, the spring presses the first conductive plate against a second conductive plate disposed within the second bezel to transmit energy through the electrical socket.

4. The power outlet of claim 1, wherein the faceplate includes a sheath defining slots, the sheath extends around an outer surface of the base having bars that engage the slots.

5. The power outlet of claim 1 further comprising a cover attached to, and hinged with, a side of the first bezel.

6. The power outlet of claim 1, wherein the adapter assembly rotates 360 degrees about the center axis of the power outlet.

7. The power outlet of claim 1, wherein the faceplate is formed from a material that allows light transmission through the faceplate such that the adapter assembly is illuminable.

8. A vehicle, comprising:
   a trim panel disposed within an interior of the vehicle; and
   an electrical socket including an adapter assembly disposed within the trim panel, the adapter assembly being disposed between first and second bezels of the electrical socket and including a base with a plurality of terminals disposed within the base and a faceplate, wherein the adapter assembly is rotatable about a central axis of the electrical socket; and
   a spring attached with, and disposed between, a back of the base and a first conductive plate, the spring presses the first conductive plate against a second conductive plate disposed within the second bezel to transmit energy through the electrical socket.

9. The vehicle of claim 8, wherein the second bezel includes a pin that extends through the first and second conductive plates.

10. The vehicle of claim 9, wherein the adapter assembly rotates 360 degrees about the central axis on the pin such that the first and second conductive plates maintain contact.

11. The vehicle of claim 8, wherein the second bezel includes a plurality of clips that secure the electrical socket into the trim panel.

12. The vehicle of claim 8, wherein the faceplate includes a sheath defining slots, the sheath extends around an outer surface of the base having bars that engage the slots.

13. The vehicle of claim 8, wherein the first bezel engages the second bezel using a plurality of clips.

14. A trim panel for a vehicle, comprising:
an electrical socket having an adapter assembly disposed between first and second bezels, the adapter assembly having a base with a plurality of terminals disposed within the base and a faceplate, wherein the adapter assembly is rotatable about a central axis of the electrical socket; and
a spring attached with, and disposed between, a back of the base and a first conductive plate, the spring presses the first conductive plate against a second conductive plate disposed within the second bezel to transmit energy through the electrical socket.

15. The trim panel of claim 14, wherein the faceplate includes a sheath defining slots, the sheath extends around an outer surface of the base having bars that engage the slots.

16. The trim panel of claim 14, wherein the adapter assembly rotates 360 degrees about the central axis.

17. The trim panel of claim 14, wherein the second bezel includes a pin that extends through the first and second conductive plates to maintain contact between the first and second conductive plates.

18. The trim panel of claim 14, wherein the faceplate is formed from a material that allows light transmission through the faceplate such that the electrical socket is illuminable.

19. The trim panel of claim 14, wherein the first conductive plate defines a surface area being less than a surface area of the first conductive plate.

\* \* \* \* \*